(12) United States Patent
Canini et al.

(10) Patent No.: US 8,791,616 B2
(45) Date of Patent: Jul. 29, 2014

(54) ELECTRIC MACHINE WITH AXIAL FLUX AND PERMANENT MAGNETS

(75) Inventors: Jean Marc Canini, Aibes (FR); Bernard Claude Lhenry, Le Creusot (FR)

(73) Assignee: DDIS, S.A.S., Anzin (FR)

( * ) Notice: Subject to any disclaimer, the term of this patent is extended or adjusted under 35 U.S.C. 154(b) by 58 days.

(21) Appl. No.: 12/865,060

(22) PCT Filed: Jan. 28, 2009

(86) PCT No.: PCT/FR2009/050122
§ 371 (c)(1),
(2), (4) Date: Jul. 28, 2010

(87) PCT Pub. No.: WO2009/095612
PCT Pub. Date: Aug. 6, 2009

(65) Prior Publication Data
US 2010/0327688 A1    Dec. 30, 2010

(30) Foreign Application Priority Data

Jan. 30, 2008    (FR) ...................................... 08 50568

(51) Int. Cl.
*H02K 21/24*    (2006.01)
*H02K 3/34*    (2006.01)
*H02K 1/22*    (2006.01)

(52) U.S. Cl.
USPC ........................ 310/156.32; 310/214; 310/266

(58) Field of Classification Search
CPC ..................................... H02K 16/02
USPC ................. 310/266, 268, 112, 114, 216.062, 310/216.007, 216.045, 156.08, 310/156.32–156.37, 91, 208, 214, 215, 194
See application file for complete search history.

(56) References Cited

U.S. PATENT DOCUMENTS

| | | | | |
|---|---|---|---|---|
| 3,590,208 | A | * | 6/1971 | Martini et al. ................... 219/92 |
| 5,619,087 | A | * | 4/1997 | Sakai ............................. 310/268 |
| 5,710,476 | A | | 1/1998 | Ampela |
| 6,011,339 | A | * | 1/2000 | Kawakami ..................... 310/208 |
| 6,194,802 | B1 | * | 2/2001 | Rao ................................. 310/91 |
| 6,555,942 | B1 | * | 4/2003 | Hsu ................................ 310/208 |
| 6,661,147 | B2 | * | 12/2003 | Tajima et al. ........... 310/216.106 |
| 6,750,588 | B1 | * | 6/2004 | Gabrys ........................... 310/268 |
| 6,762,520 | B1 | * | 7/2004 | Ehrhart et al. .................. 310/86 |
| 6,762,525 | B1 | * | 7/2004 | Maslov et al. ................. 310/112 |

(Continued)

FOREIGN PATENT DOCUMENTS

| | | |
|---|---|---|
| DE | 19703497 A1 | 8/1997 |
| DE | 10357746 A1 | 7/2005 |

(Continued)

*Primary Examiner* — John K Kim
*Assistant Examiner* — Thomas Truong
(74) *Attorney, Agent, or Firm* — Kenyon & Kenyon LLP

(57) ABSTRACT

The invention relates to an axial flux electric machine having permanent magnets and comprising a rotor surrounding a stator. It is characterized in that the stator comprises: a "support" first portion; a set of active modules constituting the secondary portion of the magnetic circuit; and fastener means for fastening the modules to the support portion.

12 Claims, 7 Drawing Sheets

(56) References Cited

U.S. PATENT DOCUMENTS

| | | | |
|---|---|---|---|
| 6,776,590 B2 * | 8/2004 | Cooper et al. | 417/423.7 |
| 6,891,306 B1 * | 5/2005 | Soghomonian et al. | 310/216.092 |
| 7,256,524 B2 * | 8/2007 | Minagawa | 310/156.36 |
| 7,714,479 B2 * | 5/2010 | Seneff et al. | 310/268 |
| 7,755,244 B2 * | 7/2010 | Ley et al. | 310/216.019 |
| 7,786,646 B2 * | 8/2010 | Lu et al. | 310/216.079 |
| 2004/0164641 A1 | 8/2004 | Yamada et al. | |
| 2006/0043821 A1 * | 3/2006 | Kojima et al. | 310/268 |
| 2006/0061230 A1 * | 3/2006 | Klippert | 310/268 |
| 2006/0131985 A1 * | 6/2006 | Qu et al. | 310/266 |
| 2007/0001540 A1 | 1/2007 | Matsuzaki | |
| 2007/0262674 A1 | 11/2007 | Shibukawa et al. | |
| 2008/0024044 A1 * | 1/2008 | Palmer et al. | 310/68 R |

FOREIGN PATENT DOCUMENTS

| | | | |
|---|---|---|---|
| EP | 0429729 A1 | 6/1991 | |
| EP | 0854558 A2 | 7/1998 | |
| EP | 1496596 A1 | 1/2005 | |
| EP | 1624552 A1 | 2/2006 | |
| EP | 1684399 A2 | 7/2006 | |
| WO | 2004042891 A1 | 5/2004 | |
| WO | WO 2007082457 A1 * | 7/2007 | H02K 1/14 |

* cited by examiner

ELECTRIC MACHINE WITH AXIAL FLUX AND PERMANENT MAGNETS

This is a 371 national phase application of PCT/FR2009/050122 filed 28 Jan. 2009, claiming priority to French patent application Ser. No. 08/50568 filed 30 Jan. 2008, the contents of which are incorporated herein by reference.

FIELD OF THE INVENTION

The present invention relates to an electric machine with axial flux and permanent magnets for converting mechanical type energy into electrical type energy.

BACKGROUND OF THE INVENTION

The axial flux electric machine may be used for converting energy in numerous fields, such as the field of electrical power stations, in the form of alternators or servo-alternators, grouped together with a steam turbine or a gas turbine, or in the field of hydro power stations, in on-board systems, or indeed in applications concerning ship propulsion and other high-power engines.

Nevertheless, in its main application, such an electric machine constitutes an alternator for a wind turbine, and in particular an alternator having axial flux and permanent magnets.

Although not limited to this application, the remainder of the application describes in detail the advantages of the electric machine made in the form of an alternator with axial flux and permanent magnets as incorporated in a wind turbine.

Starting from this example, the person skilled in the art can readily deduce the adaptations needed to make an electric machine for use in other applications such as those mentioned above.

Over recent years, the trend has been to make wind turbines of very large diameter so as to obtain very high levels of electric power without excessively increasing the number of wind turbines.

The overall structure of wind turbines has followed this trend, and in particular the electric machines or alternators of such wind turbines are becoming ever more bulky.

This change in the size of alternators, and in particular of the rotors of alternators, leads to major constraints for manufacturers since, they need to adapt their production tooling to these changes in dimensions.

Furthermore, wind turbines of small dimensions continue to be sold, so manufacturers must conserve their entire range of production tooling so as to be capable of manufacturing a full range of elements needed for making electric machines of various dimensions.

At present, certain manufacturers of electric machines manufacture the rotors and the stators as single pieces, which gives rise to major constraints in terms of logistics when moving the electric machine to its site of use, and also to constraints during installation.

Furthermore, it appears that the techniques used for making the rotor and more particularly stators come up against a size limit, in particular concerning the secondary portion of the magnetic circuit in the stator.

Documents US 2007/001540 and US 2007/262674 are known that relate to an electric machine with axial flux. According to those documents, the electric machine comprises a rotor constituted by two disks secured to a rotary shaft, each disk having a magnetization zone constituting the primary portion of said machine. Those two disks are disposed on either side of the stator, with air gaps. In addition, the stator comprises a support mounted pivotally relative to the rotary shaft supporting the disks of the rotor, the support being secured to a plurality of active modules constituting the primary portion of the machine. That fastening is obtained by embedding the active modules in the material of said support which is obtained by molding. According to document US 2007/001540, such characteristics of the electric machine enable the time required for assembling the component elements of the stator to be reduced. According to document US 2007/262674, such characteristics of the electric machine seek in particular to combat a loss in efficiency of the machine due to a magnetic field that is too strong. Such a design of machine presents the drawback of requiring component elements to be assembled together directly in the factory, which implies the machine must be conveyed on site as a single unit, and consequently can constitute a major drawback for machines of large size. In addition, a malfunction of the stator requires the machine to be fully disassembled in order to replace the stator completely.

Document WO 2004/042891 A1 discloses an electric machine with axial flux and permanent magnets that presents a stator having a support and active modules constituting the secondary portion of the magnetic circuit, the active modules being fastened releasably and radially to the periphery of the support that is in the form of a wheel rim. In addition, the rotor comprises two disks surrounding the stator, i.e. they are disposed on either side of the stator, the inside faces of the disks having magnetization zones that constitute the primary portion of the magnetic circuit. The arrangement of the two disks on either side of the stator enables two axial air gaps to be established.

SUMMARY OF THE INVENTION

An object of the present invention is to propose an electric machine with a novel design of rotor and stator enabling electric machines to be made that present a variety of sizes, and in particular that may be very large, while using a single production tool.

Another object of the invention is to provide an electric machine in which a portion of the magnetic circuit is easily changed without requiring the entire magnetic circuit to be replaced.

Another object of the present invention is to propose an electric machine in which the rotor and the stator can be paired in sectors, thereby facilitating shipping and installation of said machine.

Another object of the present invention is to propose an electric machine of fabrication and maintenance costs that are limited relative to those of the techniques used in the past.

To this end, the present invention provides an electric machine with axial flux and permanent magnets, as defined in claim 1.

The electric machine with axial flux and permanent magnets of the invention has a rotor surrounding a stator so as to constitute two axial air gaps, said stator having a "support" first portion and a set of active modules constituting the secondary portion of the magnetic circuit. According to the invention, the support portion comprises a rim with the active modules fastened radially and releasably to the periphery thereof, fastener means enabling said fastening to be performed in releasable manner.

Thus, this characteristic makes it possible at least to use active modules that are of dimensions and shape that vary little as a function of the size of the support portion, with the diameter of the support portion being adapted to the size of the machine, thus making it possible to make active modules that are suitable for stator sizes that are very different while using common production tools.

In addition, implementing fastener means that enable the active modules to be releasably fastened to the support has the purpose of facilitating installation of the electric machine directly on site where the machine is to be implemented by being installed. Furthermore, the releasable nature of each active module presents the advantage of making it possible to withdraw a single active module in the event of one of them failing, thus avoiding the need to replace the entire stator of the machine in the event of it malfunctioning.

According to another advantageous characteristic of the invention, each active module constituting the secondary portion of the stator comprises:
  a block made up of a stack of radially disposed layers;
  two spacers constituting a lower spacer and an upper spacer; and
  two coils surrounding the lower and upper spacers.

This characteristic is particularly advantageous since it enables the block of an active module to be made with standard cutter means. In addition, that makes it easy to adapt the active modules as a function of the size of the machine that is to be designed.

According to another characteristic of the invention, the lengths of the layers in the block vary and correspond to the radius of curvature of the support portion.

This arrangement makes it possible from this multilayer structure to make active portions that are suitable for fitting to a very wide variety of rim sizes.

According to another characteristic of the invention, the width of the lower and upper spacers is dimensioned so as to project beyond the plane of the rim. Such a characteristic presents the advantage, of constituting an abutment element that comes into contact with the rotor, thereby avoiding any contact between the active portion of the rotor and the active portion of the stator.

According to another characteristic that is particularly advantageous, the rim is made up of at least two sectors, the connection means being arranged between the two sectors.

This advantageous characteristic makes it possible firstly to facilitate fabrication of the rim, and secondly to fabricate installation of the machine and shipping thereof since it is possible to ship the sectors independently, with each stator sector comprising a rim sector and a plurality of active modules, and being coupled independently of the other sectors of the stator to a corresponding portion of the rotor.

According to the invention, the support portion, and in particular the rim, is made in full or in part out of fiberglass-resin composite material, which presents the advantage of lightening the structure of the stator element and thus of contributing to facilitating shipping and installation of the machine on site. Nevertheless, provision could be made for the support portion and in particular the rim to be made out of machine-welded sheet metal. Furthermore, the material that is selected depends in particular on the stiffness required for the rim and on the design of the fastener means between said rim and the active modules. The material selected for the rim may be advantageous in implementing said fastener means that enable active modules to be withdrawn.

In a first preferred embodiment, the fastener means for fastening the module to the module support portion comprise bores made in the active modules or the module support portions and co-operating with nut-and-bolt means fastened respectively to the support portion or to the active modules.

This characteristic makes it possible firstly for the active portions to be installed easily the first time they are installed on the support portion, and secondly, in the event of an active module failing, it enables the failed module to be replaced without it being necessary to replace the entire secondary portion of the magnetic circuit.

In a second embodiment, the stator includes a module support portion together with fastener means in the form of radial notches arranged at the periphery of the rim and enabling active modules to be inserted, the stator being made in full or in part out of fiberglass-resin composite material.

This characteristic is particularly advantageous since, once more, it enables the active modules to be changed independently of one another.

In another embodiment, the modules are adhesively bonded and changes are performed sector by sector.

According to another characteristic of the invention, the rotor includes at least one magnetization zone constituting the primary portion of the magnetic circuit, said at least one magnetization zone comprising a stack of permanent magnets.

This characteristic also makes it possible to design rotors over a wide variety of sizes and in particular of large dimensions while using a single production tool and with the active portion of the magnetic circuit varying little as a function of the dimensions of the rotor.

This characteristic also makes it possible to place the active portions of the rotor independently of one another and also to replace one active portion without it being necessary to replace all of said active portions of the magnetic circuit of the rotor, thereby facilitating maintenance of the machine without requiring replacement of the entire rotor.

According to another advantageous characteristic of the invention, the rotor is made up of at least two sectors, thereby making it easier ship to the site where the machine is to be installed.

Like the stator, which may likewise advantageously be made up of a plurality of sectors, this characteristic enables the various sectors of the rotor and of the stator to be shipped separately, and it being possible to pair the rotor and stator sectors without assembling together all of the rotor or stator sectors. Thus, pre-assembly may be provided sector by sector between the rotor and the stator, with final assembly of the machine taking place directly on site.

According to another characteristic, the sectors of the rotor have a U-shaped profile, the magnetization zones being located at the inner faces of the branches of the U-shape so as to enable the rotor sectors to be paired on the stator by moving the rotor radially relative to the stator. This also contributes to facilitating removal of a portion of the rotor in order to access defective active modules, where necessary, in order to replace them.

This characteristic facilitates assembly of the rotor with the stator, which assembly may be reactivated by means of a conveyor.

BRIEF DESCRIPTION OF THE DRAWINGS

Other characteristics and advantages of the invention appear more clearly on reading the following description of two preferred embodiments, with the description being given purely by way of non-limiting example and with reference to the accompanying drawings, in which.

DETAILED DESCRIPTION

Figure 1:
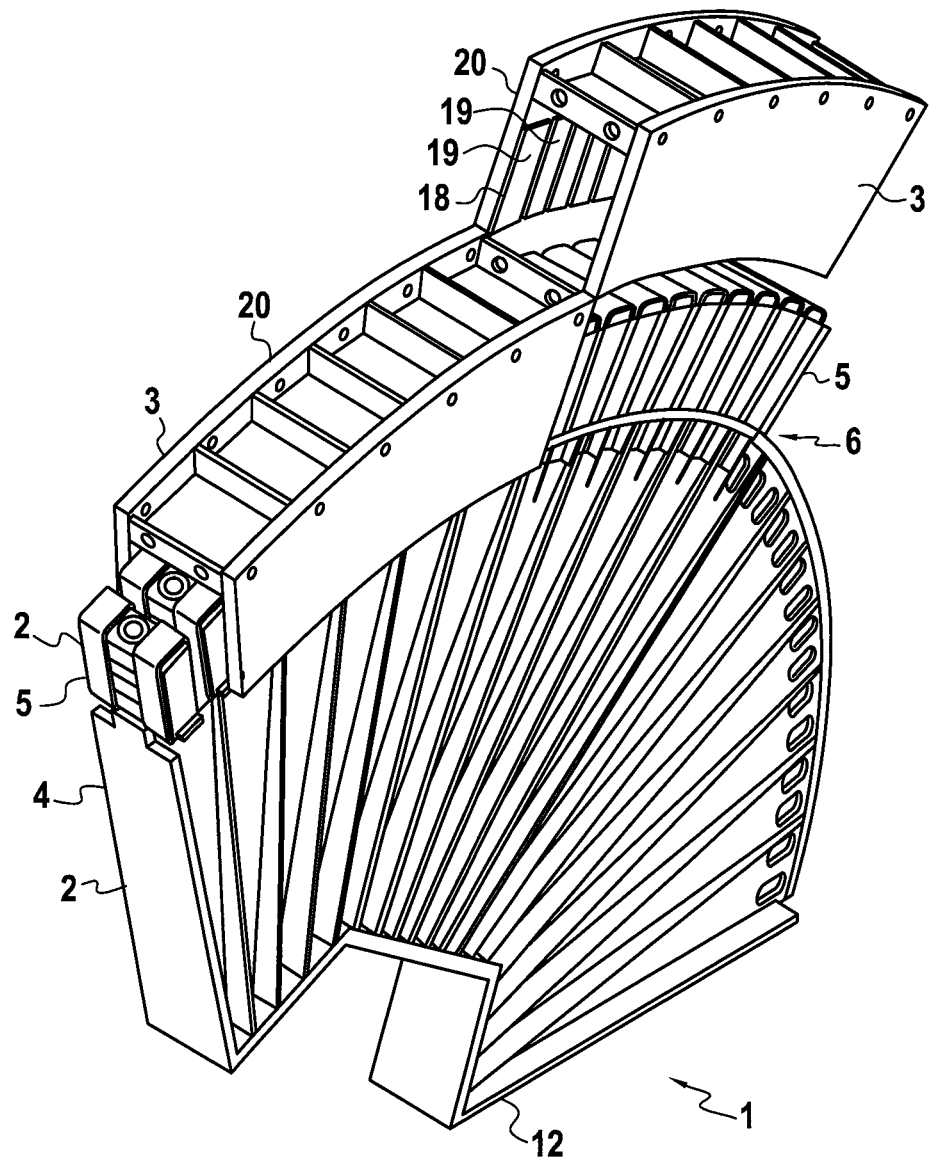
FIG. 1 is a diagrammatic perspective view of a first embodiment of a portion of an alternator made in accordance with the invention.

With reference to FIG. 1, there can be seen a component of an electric machine 1, i.e. a stator 2 for co-operating with a rotor 3.

The stator 2 comprises a first support piece 4 and a set of active modules 5 constituting the secondary portion of the magnetic circuit.

FIG. 1 also shows fastener means 6 for fastening modules 5 on the support portion of the stator 4.

Figure 3:
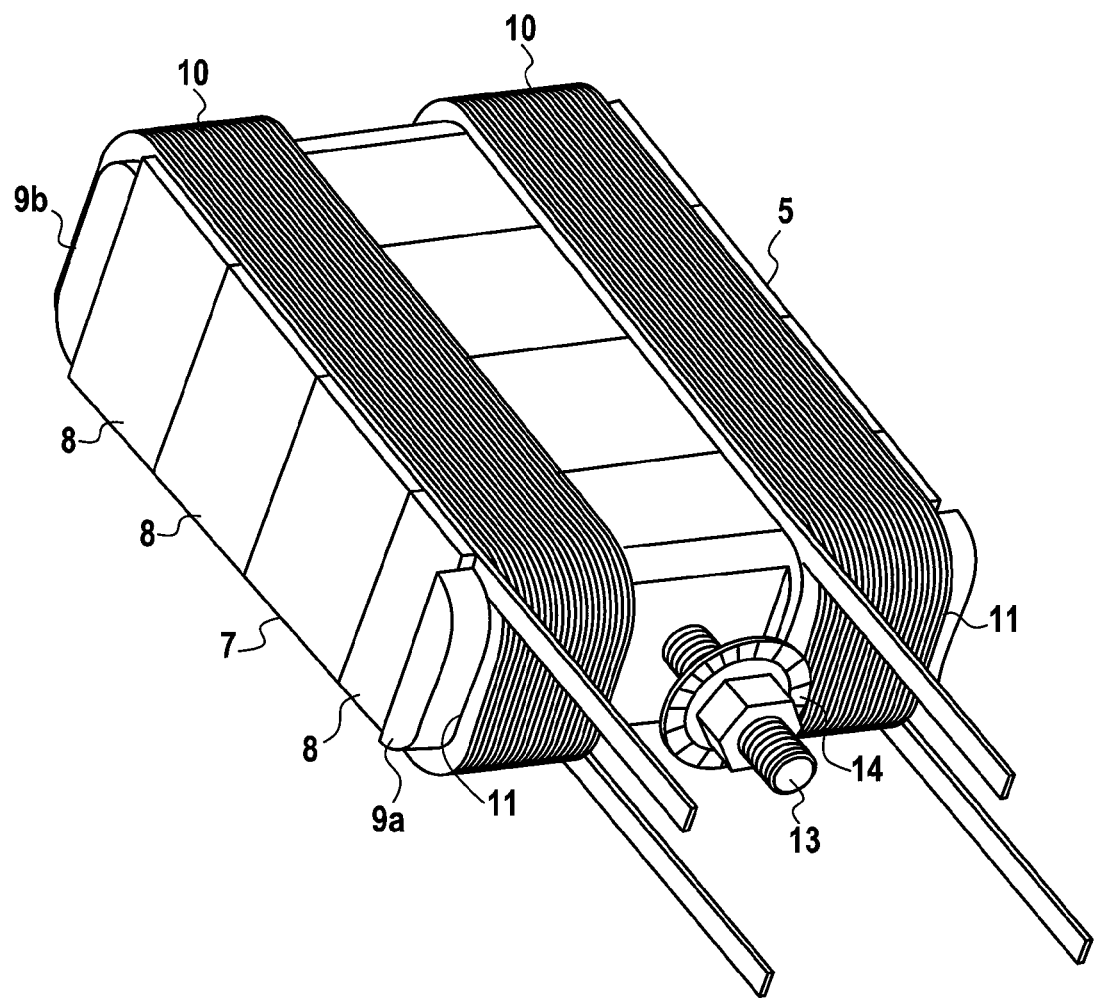
FIG. 3 shows an embodiment detail of the alternator made in accordance with the present invention.

With reference more particularly to FIG. 3, there can be seen an embodiment of an active module 5 that is to be fastened to the support portion 4.

Each module 5 comprises a block 7 made up of a stack of layers 8, the active module 5 also having two spacers 9a and 9b constituting lower and upper spacers respectively, together with two coils 10 surrounding the bottom and top spacers 9a and 9b.

Advantageously, notches 11 are formed in the spacers 9a and 9b to receive each of the coils 10 and to avoid a coil escaping, in particular given the force exerted by the magnetic field thereon.

It is also important to observe that the width of the spacers may be dimensioned so as to project beyond the panel of the support portion 4 and optionally constitute an abutment preventing any catching between the rotor and the coils of the stator 2.

The design of the block 7 in layers 8 makes it possible to have layers 8 of varying lengths, thus making it possible to match the radius of curvature of the support portion 4.

Consequently, to make the block 7, it suffices for the manufacturer to adapt the length of each layer 8 in order to obtain a block that matches the dimensions of the support portion 4.

It can thus easily be understood that the manufacturer can make active modules 5 of various sizes using the same cutter tool, by adjusting the length of each magnetic lamination representing a layer 8, and optionally by adding or withdrawing one or more layers as a function of the technical characteristics required for the magnetic circuit.

In the various embodiments shown in FIGS. 1 to 7, the electric machine 1 has a stator 2 with a support portion 4, with active modules 5 comprising a rim.

This rim is advantageously constituted by at least two rim sectors 12, the rim sectors 12 being easily assembled together on site using operations that are conventional for the person skilled in the art, in particular welding or riveting.

Advantageously, to make the rim, three rim sectors 12 are cut out over 120° or four sectors over 90°; nevertheless, in particular as a function of the dimensions of the rim, it is also possible to envisage using a larger number of sectors 12 to make the rim.

As mentioned above, provision is also made for fastener means 6 for fastening modules 5 on the support portion 4.

Figure 2:
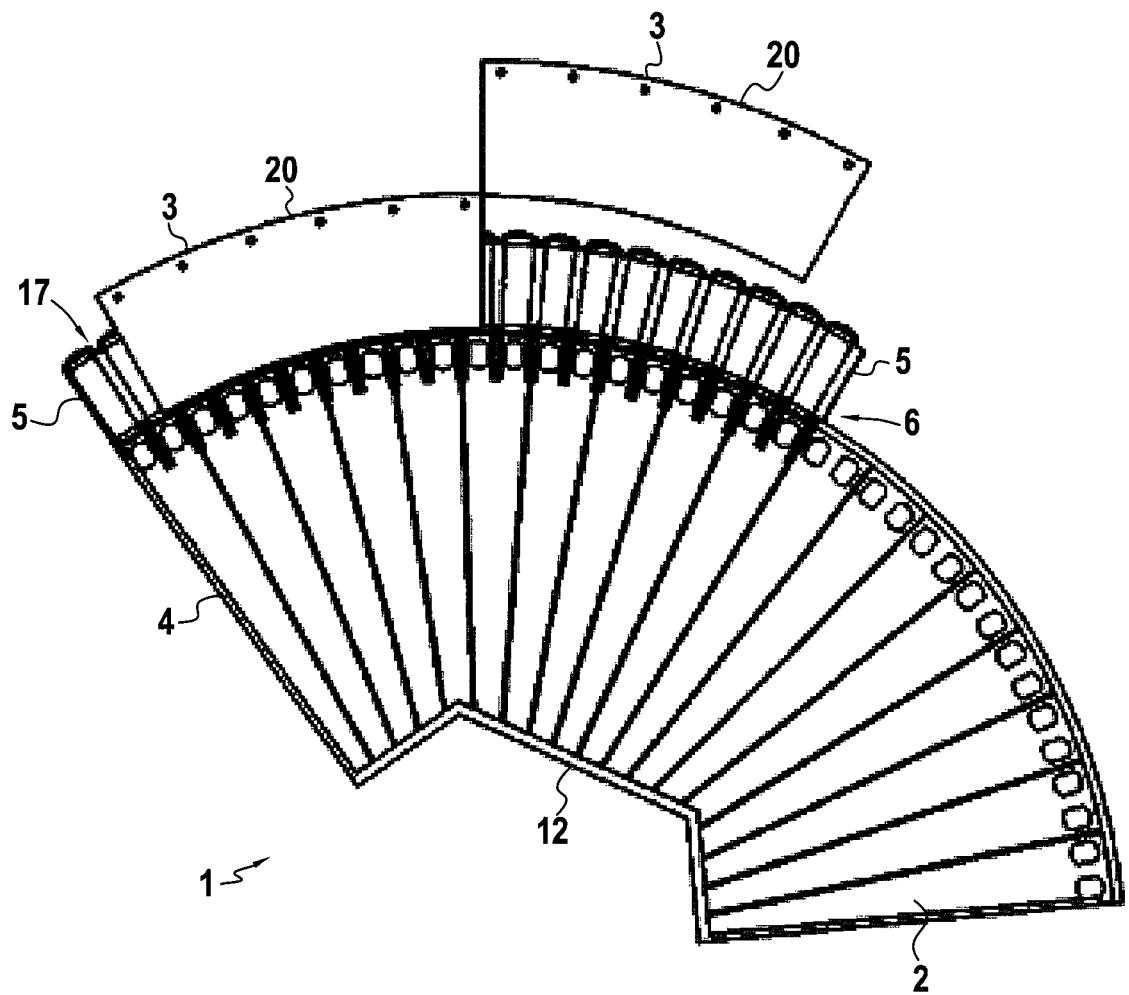
FIG. 2 is a second view of the embodiment shown in FIG. 1, here shown in section.

In a first embodiment shown in FIGS. 1 and 2, the fastener means 6 comprise bores made either in the modules 5 or in the support portions 4 and co-operating with nut-and-bolt means fastened to the other portion.

In the embodiment of FIG. 1, it can thus be seen that the module 5 includes a nut-and-bolt system 13-14, the threaded bolt co-operating with a bore made in the top face of the so-called support portion 4.

Figure 4:
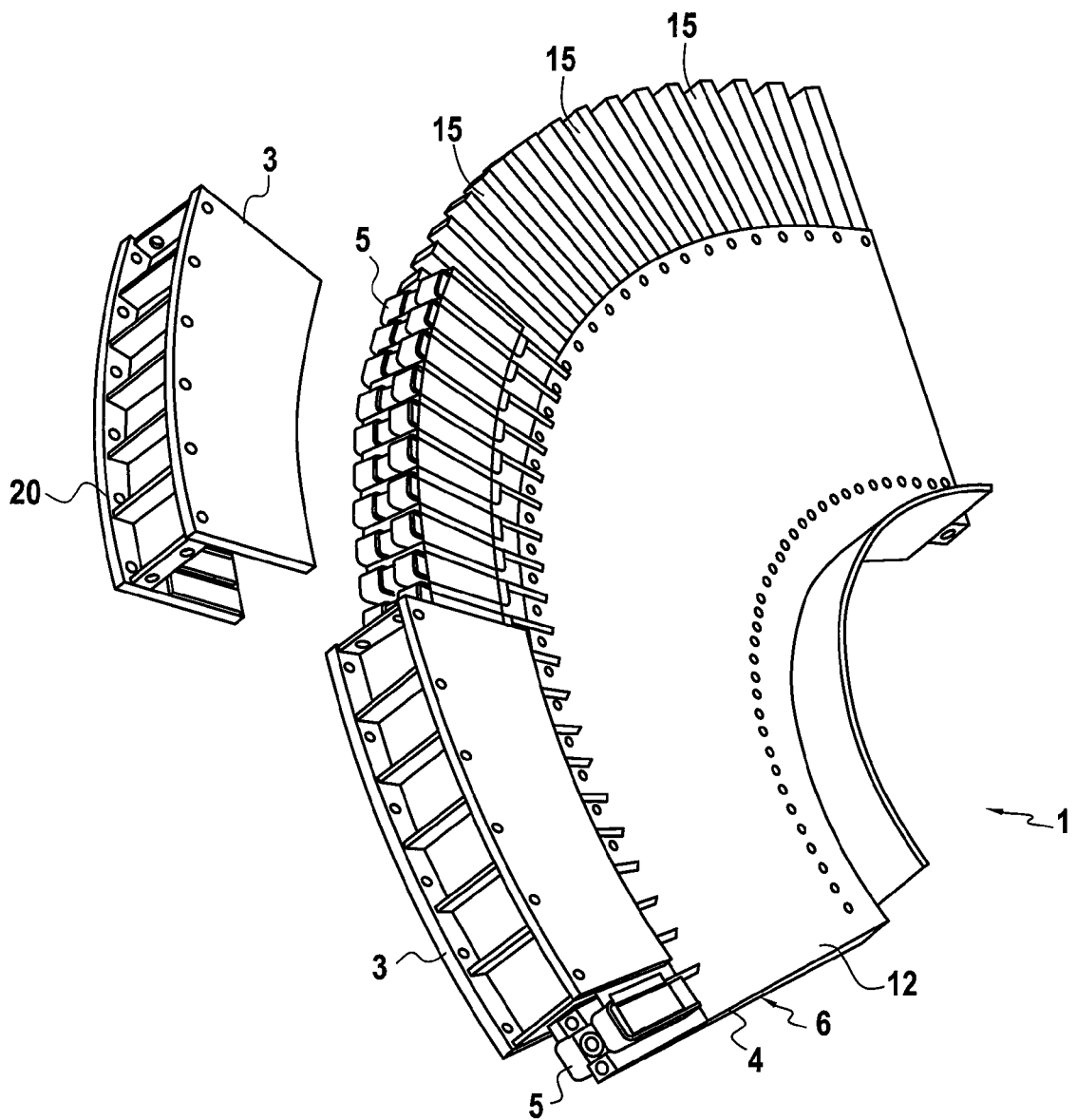
FIG. 4 is a diagrammatic perspective view of a second embodiment of an alternator in accordance with the invention.
Figure 5:
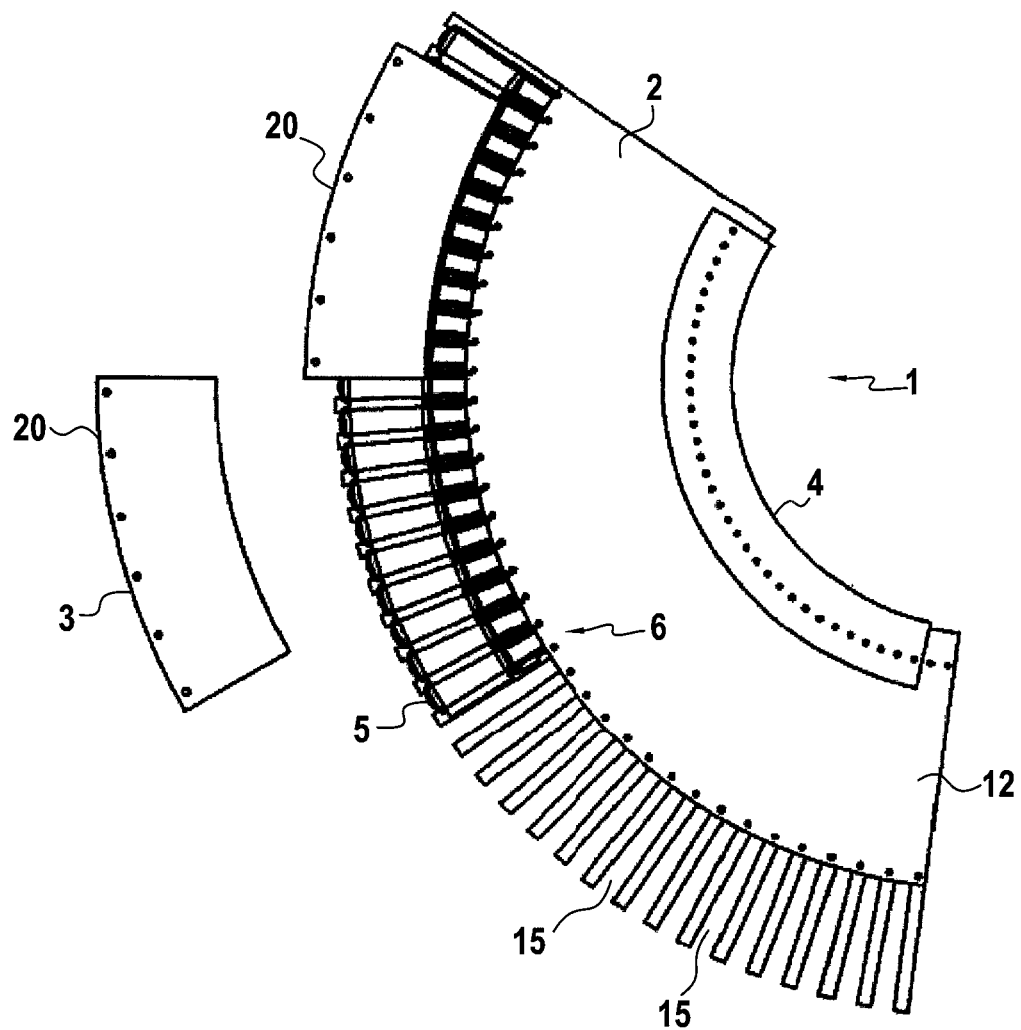
FIG. 5 is a section view of the embodiment shown in FIG. 4.

With reference to FIGS. 4 and 5, there can be seen a second embodiment of fastener means between the modules 5 and the support portion 4.

In this embodiment, the stator 2 has a support portion 4 made in full or in part out of a fiberglass-resin composite material.

This support portion 4 has fastener means 6 made in the form of radial notches 15 that enable the active modules 5 to be inserted therein.

Figure 6:
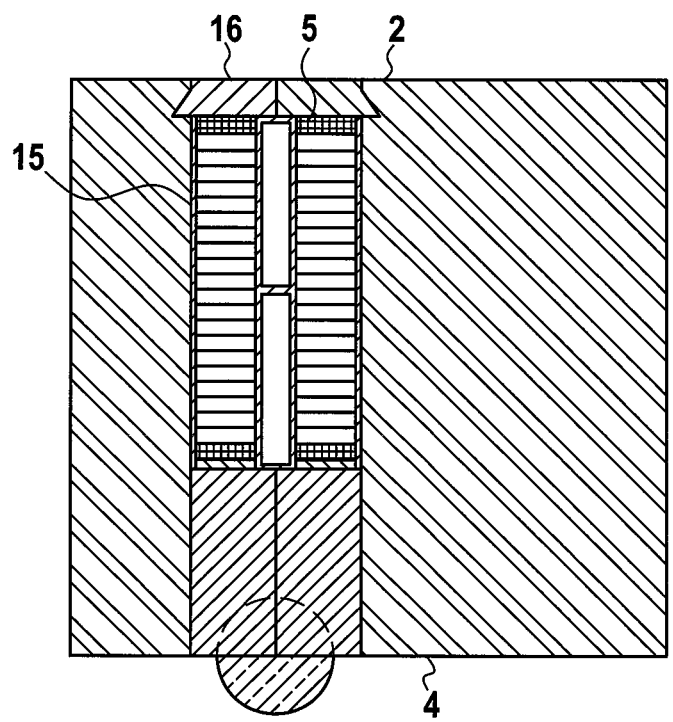
FIG. 6 shows an embodiment detail of the stator shown in FIGS. 4 and 5.

With reference mainly to FIG. 6, there can be seen an active module 5 disposed in a notch 15. In order to avoid any accidental withdrawal of the module 5 from the notch 15, a plug 16 is provided, advantageously made of teflon, and having a dove-tail profile suitable for closing the notch 15 formed in the stator 2. In order to ensure the stator operates correctly, it is common practice to perform a step of impregnating the active portions, which step requires the use of soaking vessels and an oven of large dimensions.

The modular design described above makes it possible to facilitate the impregnation stage considerably since each module may be impregnated separately prior to being mounted on the support portion 4, and consequently this may be done in vessels and ovens of small dimensions that are independent of the size of the alternator, thereby contributing to using a single fabrication tool that is independent of the size of the machine.

As indicated above, the electric machine 1 has a set of active modules and the description above relates to a set of active modules constituting the secondary portion of the magnetic circuit together with a description of a stator 2 including a set of active modules 5.

In the invention, the design of the rotor also contributes to using a single production tool, regardless of the size of the machine. In addition, the design of the rotor also contributes to facilitating assembly of the machine directly on site, thus enabling component parts to be transported, as for the stator. Furthermore, the design of the rotor also contributes to facilitating maintenance operations by enabling active elements of the rotor to be replaced in part only.

Figure 7:
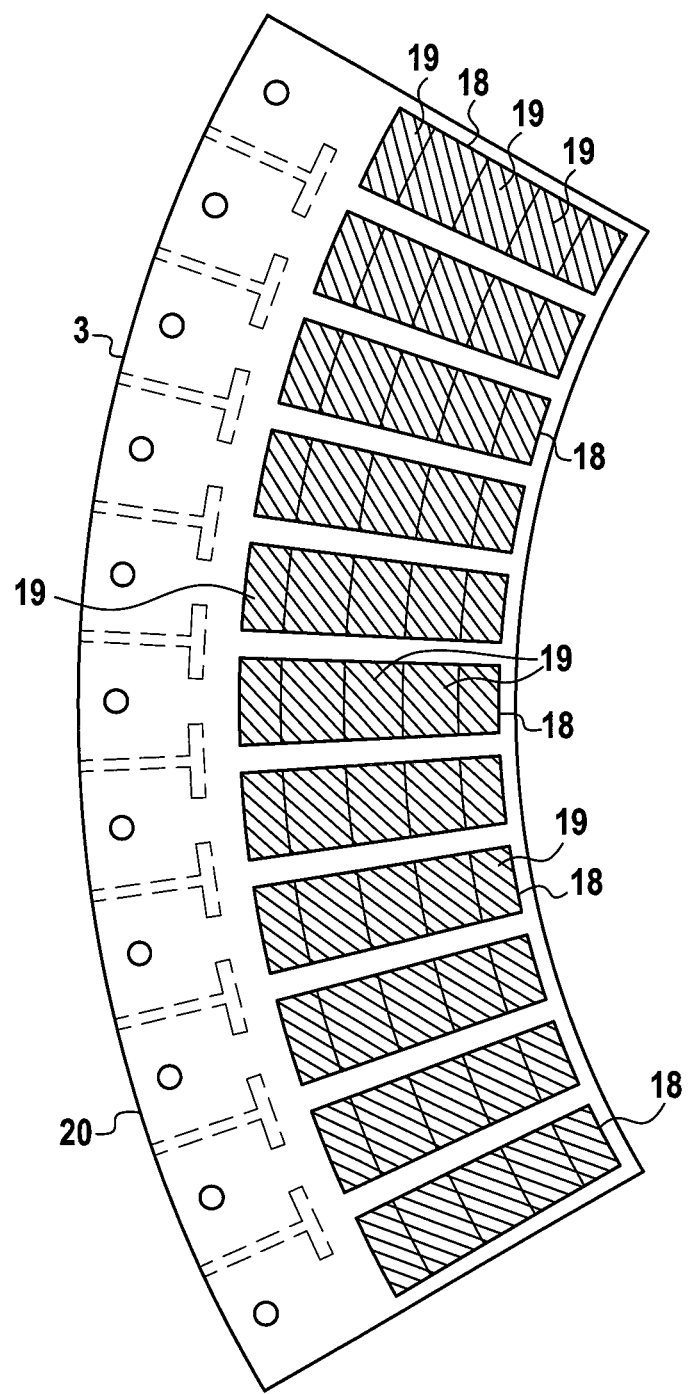
FIG. 7 is a diagram showing an embodiment of a rotor in accordance with the present invention.

With reference to FIG. 7, there can be seen a rotor 3 having at least one magnetization zone 18 constituting the primary portion of the magnetic circuit, said zone comprising a stack of permanent magnets 19.

In FIG. 7, it can be seen that the permanent magnets 19 in a given zone 18 are of different lengths.

The length of each magnet 19 is determined as a function of the shape of the corresponding secondary portion.

Advantageously, the rotor 3 is made up of at least two sectors 20.

Advantageously, the number of sectors 20 of the rotor portion 3 corresponds to the number of sectors 12 of the stator 2, and in particular there are three or four sectors.

This characteristic is particularly advantageous since it enables the rotor 3 and the stator 2 to be moved in paired manner and then enables the rotor sectors 3 and the stator sectors 2 to be assembled together on site.

In order to fasten the magnets to the surface of the rotor 3, provision is made for an adhesive bonding operation or indeed for riveting.

With reference to FIG. 7, it can be seen that the sectors 20 are of U-shaped profile, this disposition being particularly advantageous since it enables the primary portion to be positioned accurately relative to the stator 2.

It is also possible to provide clamping that imposes a small spacing between the branches by pinching the branches of the U-shape on the bridge constituting the spacer so that once the sector has been positioned, the branches become parallel to one another under the effect of the magnetic field.

Naturally, other characteristics within the competence of the person skilled in the art could equally well be envisaged without thereby going beyond the ambit of the invention as defined by the following claims.

The invention claimed is:

1. An axial flux electric machine having permanent magnets constituting a magnetic circuit comprising a primary and a secondary portions, said axial flux electric machine comprising a rotor surrounding a stator, so as to constitute two axial air gaps, the rotor having magnetization zones constituting the primary portion of the magnetic circuit and the stator comprising a first and a second sides and having a support portion including a rim defining a plane, active modules constituting the secondary portion of the magnetic circuit, and fastener elements arranged to fasten the active modules removably to the periphery of the rim, wherein the rotor is made up of at least three sectors that are secured together, each of the sectors having a U-shaped profile comprising at least two branches, each with an internal and an external faces, the magnetization zones being disposed on the inside faces of the two branches of the U-shaped profile, the inside faces extending radially along said first and second sides of the stator, to enable the sectors to be paired on the stator by moving the sectors radially relative to the stator, the rim of the stator being also made of at least three sectors, said sectors being connected together, and wherein each active module comprises a block constituted by a stack of radially placed layers, two spacers constituting a lower spacer and an upper spacer, and at least a coil surrounding the lower and upper spacers, the lower and upper spacers protruding from said plane of the rim so as to constitute an abutment preventing any catching between the rotor and the coils of the stator.

2. An electric machine according to claim 1, wherein the layers of the block are of varying lengths and correspond to the radius of curvature of the support portion.

3. An electric machine according to claim 1, wherein the layers of the block are made of magnetic lamination sheet material.

4. An electric machine according to claim 1, wherein the active modules are impregnated separately prior to being fastened to the rim.

5. An electric machine according to claim 1, wherein the rim is constituted by four sectors and the rotor is made up of four sectors.

6. An electric machine according to claim 1, wherein the support portion is made in full or in part out of fiberglass-resin composite material and the fastener elements comprise radial notches enabling the active modules to be inserted therein.

7. An electric machine according to claim 6, wherein the fastener elements include, for each radial notch, an abutment preventing the active modules that are inserted in said radial notches from exiting.

8. An electric machine according to claim 1, wherein the rim is made of machine-welded sheet metal.

9. An electric machine according to claim 8, wherein the fastener elements include bores made in the active modules or the rim that cooperate with nuts and bolts fastened, respectively, to the rim or the active modules.

10. An electric machine according to claim 1, wherein the magnetization zones comprise stacks of permanent magnets in the radial direction.

11. An electric machine according to claim 10, wherein the permanent magnets are of varying lengths and match the shape of the secondary portion.

12. An electric machine according to claim 1, wherein each of the sectors of the rotor comprises a single piece having a U-shaped profile.

\* \* \* \* \*